United States Patent
Yamashita et al.

(10) Patent No.: US 6,179,935 B1
(45) Date of Patent: Jan. 30, 2001

(54) SOLDER ALLOYS

(75) Inventors: Mitsuo Yamashita; Shinji Tada; Kunio Shiokawa, all of Kawasaki (JP)

(73) Assignee: Fuji Electric Co., Ltd., Kanagawa (JP)

( * ) Notice: Under 35 U.S.C. 154(b), the term of this patent shall be extended for 0 days.

(21) Appl. No.: 09/059,268

(22) Filed: Apr. 14, 1998

(30) Foreign Application Priority Data

Apr. 16, 1997 (JP) ................................... 9-097828
Jul. 16, 1997 (JP) ................................... 9-191391
Aug. 7, 1997 (JP) ................................... 9-212969

(51) Int. Cl.[7] .......................... B23K 35/22; B23K 35/26
(52) U.S. Cl. .................... 148/400; 420/557; 420/560; 420/561; 420/562
(58) Field of Search .................. 420/560, 561, 420/562, 557; 148/400

(56) References Cited

U.S. PATENT DOCUMENTS 5,405,577 * 4/1995 Seelig et al. ........................ 420/561
5,837,191 * 11/1998 Gickles .............................. 420/560

FOREIGN PATENT DOCUMENTS

| | | |
|---|---|---|
| 55-020403 | * 2/1980 | (JP) . |
| 62-230493 | * 10/1987 | (JP) . |
| 3255637 | * 11/1991 | (JP) . |
| 8132279 | * 5/1996 | (JP) . |
| 9425634 | * 11/1994 | (WO) . |

* cited by examiner

*Primary Examiner*—Sikyin Ip
(74) *Attorney, Agent, or Firm*—Venable; Robert J. Frank; Ashley J. Wells

(57) ABSTRACT

A solder alloy which is lead free, consists essentially of, in weight %: Sn; $0 < Ag \leq 4.0$; $0 < Cu \leq 2.0$; $0 < Ni \leq 1.0$; and $0 < Ge \leq 1.0$, wherein addition of Ni and Ge to the solder alloy enhances wettability and tensile strength, and prevents formation of an oxide film. Additionally, a solder alloy which is lead free, consists essentially of, in weight %: Sn; $0 < Sb \leq 3.5$; $0 \leq Ag \leq 4.0$; $0 < Ge \leq 1.0$; and at least one first additive selected from the group consisting of (a) $0 < Ni \leq 1.0$ and (b) a combination of $0 < Ni \leq 1.0$ and $0 < Cu \leq 1.0$; wherein addition of Ni and Ge to the solder alloy enhances wettability and tensile strength, and prevents formation of an oxide film.

2 Claims, 2 Drawing Sheets

SOLDER ALLOYS

This application is based on Patent Applications No. 9-097,828 filed Apr. 16, 1997, No. 9-191,391 filed Jul. 16, 1997, and No. 9-212,969 filed Aug. 7, 1997 in Japan, the contents of which are incorporated hereinto by reference.

BACKGROUND OF THE INVENTION

1. Field of the Invention

The present invention relates to solder alloys used for metal joining in electronic devices, more specifically to solder alloys which do not contain lead nor cause pollutions.

2. Description of the Related Art

In general, soldering is performed for the purpose of mechanical or electrical joining. When making soldering, the following points are required.

First, the solder alloys are required to be superior in joining properties and corrosion resistance.

Secondly, the solder alloys desirably have a high thermal fatigue strength and a desired soldering temperature, and do not contain lead from the environmental point of view.

That is, lead in any form shows an internal accumulative toxicity. Therefore, problems of air pollution and waste treatment in the lead smelting process, accumulation in the physical bodies of babies and pregnant women due to exposure to the air and contamination of foods and the like are concerned.

Thirdly, the solder alloys are required to be high in thermal fatigue strength. This is because, since semiconductor device chips generate heat when powered and the soldering part of joined chip metals is face joining, a large thermal strain generates in the soldering part of chips, and the solder alloys forming the soldering part are subjected to rigorous operation environment.

Fourthly, the solder alloys are desirably those which are high in melting points and hard to be affected by temperature profile of subsequent processes. This is because from the construction of semiconductor devices, solder alloys of a plurality of types with different soldering temperatures are used when a plurality of soldering steps are carried out in the production of semiconductor devices.

Conventional solder alloys include tin-lead (Sn—Pb) alloy, tin-silver (Sn—Ag) alloy, and tin-antimony (Sn—Sb) alloy. Features and problems of these alloys will be described in the following.

Since the tin-lead (Sn—Pb) alloy is low in tensile strength and superior in ductility, it is high in strain generation and low in fatigue strength. Consequently, as will be described below, in conjunction with its low heat resistance, it is low in thermal fatigue strength. The Sn—Pb alloy has an eutectic temperature of 183° C. The melting point can be increased from 183° C. to the vicinity of 300° C. by increasing the Pb content. However, since this widens the solid-liquid coexistence area between liquid phase temperature and solid phase temperature (183° C.) and the eutectic temperature is 183° C., it has problems in that it is low in heat resistance and tends to undergo material degradation at relatively low temperatures. Further, it is not desirable as a solder alloy because it contains Pb. As solder alloys in place of the Sn—Pb alloy which do not contain Pb and are high in heat resistance, Sn—Sb alloy having a melting point of 232–245° C. and Sn—Ag alloy having an eutectic temperature of 221° C. are widely known.

The Sn—Ag alloy with the eutectic temperature of 221° C. is good in thermal fatigue characteristics, however, from the practical point of view, in some cases it is required to be even further improved in thermal fatigue characteristic and have a higher melting point.

The Sn—Sb alloy is relatively higher in strength and is thus better than the Sn—Pb alloy. The Sn—Sb alloy contains 8.5% by weight of Sb, has a peritectic point at 245° C., and Sb is used normally in an amount of less than 8% by weight. Since melting takes place between melting temperature 232° C. of Sb and the peritectic temperature 245° C., the solid-liquid coexistence area is small, the heat resistance is good, and one which is high in strength can be obtained by increasing the Sb content. However, the Sn—Sb alloy has problems in that it becomes degraded in processability when the Sb content is increased, and becomes low in wettability at soldering. Then, a solder alloy in which silver, copper, and nickel are added to the Sn—Sb alloy is known as one which is improved in thermal fatigue strength and wettability of the Sn—Sb alloy by suppressing the Sb content. However, since such an alloy contains tin as a main component, it has a problem in that when the solder alloy is melted an oxide film is formed on the surface and wettability or solderability is insufficient.

That is, in the Sn—Sb solder alloy, Sb is added to enhance the thermal fatigue characteristic at the melting point 232° C. to 240° C., and improvement of wettability and further increase in strength are achieved by the addition of Ag, Cu, and Ni.

Addition of Ag improves the fatigue strength and wettability. Ag exists in high concentration at crystal grain boundary, and suppresses movement of the crystal grain boundary thus improving the fatigue strength. However, the Sn—Ag alloy has an eutectic point (eutectic temperature) of 221° C. at Sn-3.5 wt % Ag, and decreases in melting point by the addition of Ag, the decrease in melting point can be made up for by adding Cu and Ni to increase the melting point. Ag is added in an amount of 3 wt % and an alloy containing 6 wt % Ag has the same level of strength. When the Ag content exceeds 3.5 wt %, since the melting point (liquid phase temperature) is increased which requires an increase in the soldering temperature in order to ensure the wettability, and this further results in increased solid-liquid coexistence area.

Addition of Cu forms a solid solution in Sn and improves heat resistance and alloy strength without degrading the wettability. When Cu is added in an amount of more than 3 wt %, the melting point (liquid phase temperature) sharply increases. Further, as pointed out in Japanese Patent Application Laying-open No. 5-50286, formation of intermetallic compounds ($Cu_3Sn$ and the like) increases, resulting in degraded fatigue strength. Even 0.5 wt % addition of Cu improves the strength.

Addition of Ni, since which is high in melting point (1450° C.), provides thermal stability of the alloy, formation of fine crystal texture, improvement of thermal fatigue characteristic by formation of a Ni—Sn compound, and suppresses formation of intermetallic compound ($Cu_3Sn$) which decreases joining strength when soldered with a Cu substrate. When the Ni content is increased (more than 5 wt %), alloy production becomes difficult, and viscosity becomes high at soldering which decreases solder spreading. When the Ni content is less than 1.0 wt %, the strength and wettability are improved. When the Ni content exceeds 1 wt %, the resulting alloy becomes hard and rolling processability is impaired.

SUMMARY OF THE INVENTION

In view of the above described points, a first object of the present invention is to provide a Sn—Sb solder alloy by improving a Sn—Sb alloy containing silver, copper, and nickel, which has a good strength and is thermally stable, and is good in solderability.

A second object of the present invention is to provide a Sn—Sb solder alloy by improving a Sn—Sb solder alloy, which is good in wettability and thermal fatigue strength.

A third object of the present: invention is to provide a Sn—Ag solder alloy by improving a Sn—Ag alloy, which has a good strength, is thermally stable, and is good in solderability.

In a first aspect of the present invention, there is provided a solder alloy comprising:

$0<Sb\leq 3.5$;

$0\leq Ag\leq 4.0$; and a predetermined amount of at least one of first and second additives for improving solder characteristics, in addition to In as a main component.

Here, the first additive mal, be at least one selected from a group consisting of:

$0<Cu\leq 1.0$ (weight %); and $0<Ni\leq 1.0$ (weight %).

The second additive may be at least one selected from a group consisting of:

$0<P\leq 1.0$ (weight %); and $0<Ge\leq 1.0$ (weight %).

In a second aspect of the present invention, there is provided a solder alloy comprising:

$0<Ag\leq 4.0$ (weight %); and at least one of $0<Cu\leq 2.0$ (weight %) and $0<Ni\leq 1.0$ (weight %), in addition to Sn as a main component.

Here, the solder alloy may further comprise at least one additive selected from a group consisting of:

$0<P\leq 1.0$ (weight %); and $0<Ge\leq 1.0$ (weight %).

The above and other objects, effects, features and advantages of the present invention will become more apparent from the following description of the embodiments thereof taken in conjunction with the accompanying drawings.

DETAILED DESCRIPTION OF THE PREFERRED EMBODIMENTS

The present invention provides compositions of tin-based solder alloy which can be grouped into two types.

One type of the solder alloy is of Tin (Sn)—Antimony (Sb). That is, a solder alloy comprises: $0<Sb\leq 3.5$; $0\leq Ag\leq 4.0$; and a predetermined amount of at least one of first and second additives for improving solder characteristics, in addition to Sn as a main component. The first additive is provided for improving the properties of thermal resistance, strength, thermal fatigue, and bonding strength to a Cu substrate. Thus, the first additive may be at least one selected from a group consisting of: $0<Cu\leq 1.0$ (weight %); and $0<Ni\leq 1.0$ (weight %). The second additive is provided for improving the properties of preventing an oxidation of metallic components in the alloy. Thus, the second additive may be at least one selected from a group consisting of: $0<P\leq 1.0$ (weight %); and $0<Ge\leq 1.0$ (weight %).

Another type of solder alloy is of Tin (Sn)—Silver (Ag). The solder alloy comprises: $0<Ag\leq 4.0$ (weight %); $0<Cu\leq 2.0$ (weight %); and $0<Ni\leq 1.0$ (weight %), in addition to Sn as a main component. The solder alloy may further comprise at least one additive selected from a group consisting of: $0<P\leq 1.0$ (weight %); and $0<Ge\leq 1.0$ (weight %) for improving the properties of preventing an oxidation of metallic components in the alloy.

Hereinafter, we will describe embodiments of those alloys in detail.

(1) Sn—Sb solder alloy with Cu and/or Ni

A first embodiment of the solder alloy is a Sn—Sb type solder alloy containing tin (Sn) as a main component.

Figure 1:
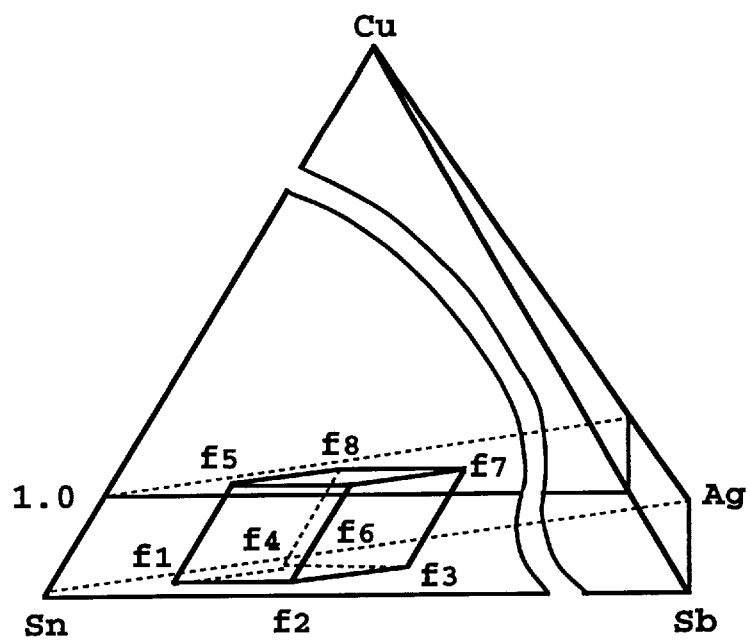
FIG. 1 is an enlarged diagram of part of a regular tetrahedron showing an optimum compositional area of a solder alloy comprising Sn, Sb, Ag, and Cu.
Figure 2:
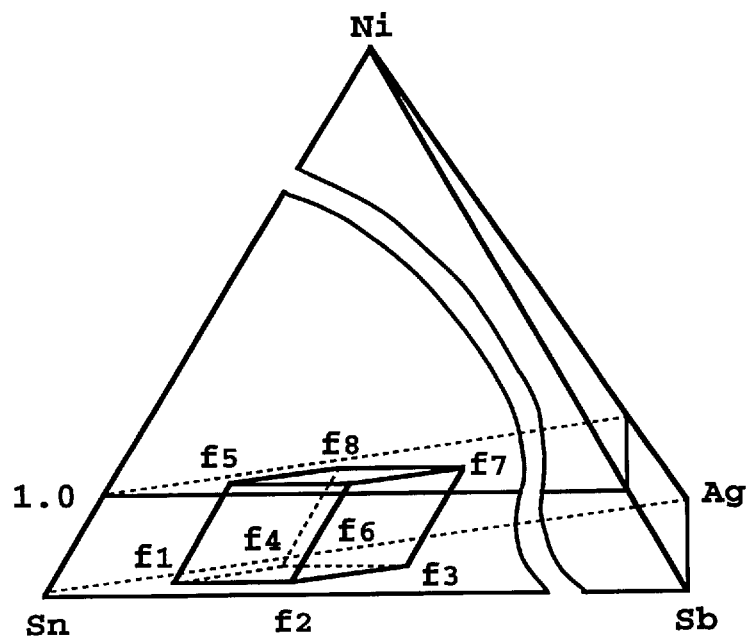
FIG. 2 is an enlarged diagram of part of a regular tetrahedron showing an optimum compositional area of a solder alloy comprising Sn, Sb, Ag, and Ni.
Figure 3:
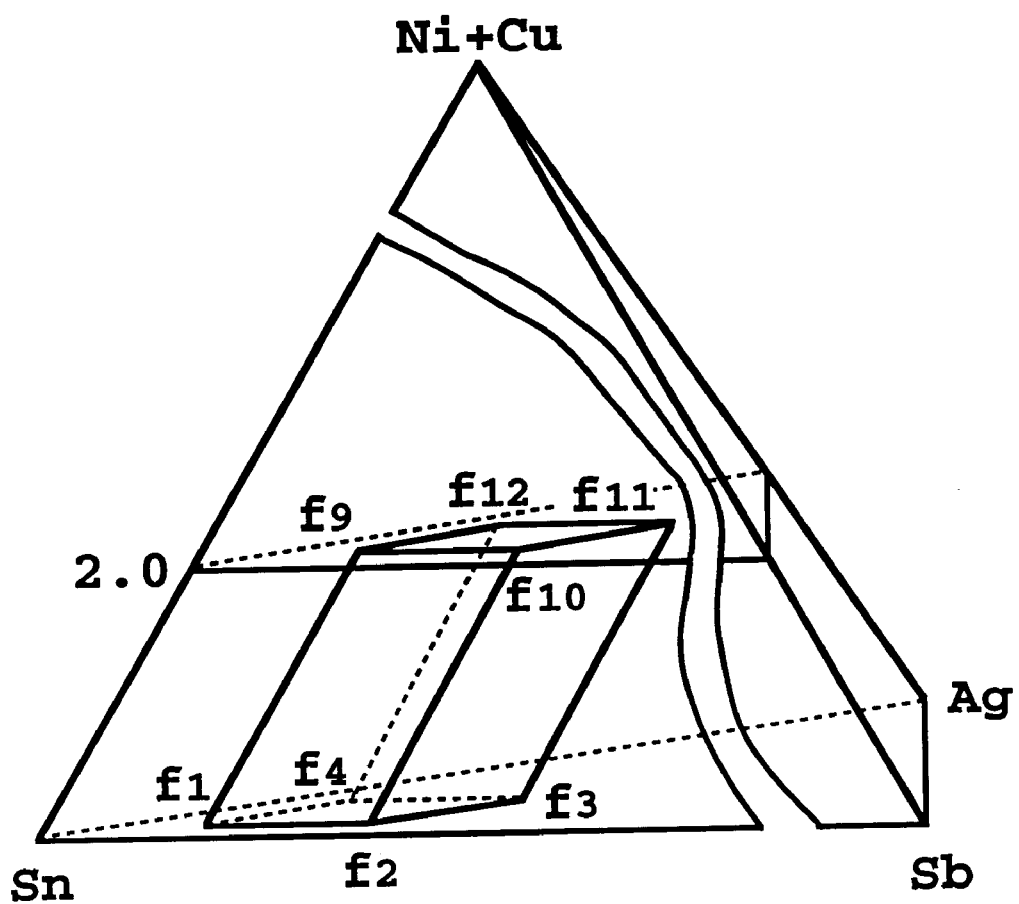
FIG. 3 is an enlarged diagram of part of a 5 regular tetrahedron showing an optimum compositional area of a solder alloy comprising Sn, Sb, Ag, and Ni+Cu.

FIG. 1 is an optimum compositional area diagram of a solder alloy comprising Sn, Sb, Ag, and Cu, FIG. 2 is an optimum compositional area diagram of a solder alloy comprising Sn, Sb, Ag, and Ni, and FIG. 3 is an enlarged diagram of part of a regular tetrahedron showing an optimum compositional area of a solder alloy comprising Sn, Sb, Ag, and Ni+Cu.

In these diagrams, the optimum compositional area is one which is surrounded by f1, f2, f3, f4, f5, f6, f7, and f8, or surrounded by f1, f2, f3, f4, f9, f10, f11, and f12. However, a plane surrounded by f1, f2, f3, and f4 is not included. When n is an integer from 1 to 12, fn (Sb wt %, Ag wt %, Cu wt % or Ni wt % or (Cu+Ni) wt %, Sn wt %) indicates a solder composition within the regular tetrahedron. Weight % of a metal is a length of a perpendicular line drawn from each composition to the four planes when the height of the regular tetrahedron is assumed as 100. In (Cu+Ni) wt %, each of Cu and Ni is 1.0 wt % or less.

f1 (2.5, 1.0, 0, 96.5), f2 (3.5, 1.0, 0, 95.5), f3 (3.5, 3.5, 0, 93.0), f4 (2.5, 3.5, 0, 94.0), f5 (2.5, 1.0, 1.0, 95.5), f6 (3.5, 1.0, 1.0, 94.5), f7 (3.5, 3.5, 1.0, 92.0), f8 (2.5, 3.5, 1.0, 93.0), f9 (2.5, 1.0, 2.0, 94.5), f10 (3.5, 1.0, 2.0, 93.5), f11 (3.5, 3.5, 2.0, 91.0), f12 (2.5, 3.5, 2.0, 92.0).

Solder alloys are fabricated by melting the respective raw material metals Sn, Sb, Ag, Cu, Ni in an electric furnace.

EXAMPLE 1

Sn—Sb alloys comprising the compositions shown in Table 1 were fabricated as shown below, and the respective alloys were measured for physical characteristics.

The raw material metals used in the present example had purities of 99.99 wt % or better. The molten raw materials were cast into a molding die to fabricate a test specimen (3 mmφ), and part of the molten materials was used for wettability measurement. Tensile test was performed on the above test specimen at a distortion velocity of 0.2 % per second at room temperature. The wettability was measured by a meniscograph method using a flux (RMA type). The solder raw materials were heated to 280° C. to melt, and a 2 mmφ copper wire was immersed therein to measure a wetting power.

Melting point, tensile strength, fracture elongation, and wetting power of the alloys of respective compositions are shown in Table 1. Numerals showing the compositions in the Table are represented in % by weight.

TABLE 1

| Sb | Ag | Cu | Ni | Sn | Melting point (° C.) | Tensile strength (kg/mm²) | Elongation (%) | Wetting power (mN) |
|---|---|---|---|---|---|---|---|---|
| 8 | — | — | — | remnant |  | 4.11 | 43 | 1.2 |
| 7 | — | — | — | remnant |  | 4.31 | 47 |  |
| 5 | — | — | — | remnant | 243/235 | 2.42 | 84 | 1.24 |
| 4 | — | — | — | remnant |  | 2.73 | 44 | 1.27 |
| 3 | — | — | — | remnant | 240/235 | 1.21 | 137 | 1.32 |
| 3 | — | 0.5 | — | remnant |  | 2.36 | 25 | 1.39 |
| 3 | — | 1 | — | remnant | 235/230 | 3.64 | 45 | 1.33 |
| 3 | — | — | 0.5 | remnant |  | 3.53 | 18 | 1.51 |
| 3 | 1 | — | 0.2 | remnant |  | 6.04 | 34 | 1.33 |
| 3 | 1 | 0.5 | 0.2 | remnant |  | 5.34 | 14 | 1.3 |
| 3 | 1 | 1 | — | remnant | 233/222 | 5.34 | 32 | 1.33 |
| 3 | 1 | 1 | 0.5 | remnant | 232/220 | 4.73 | 21 | 1.45 |
| 3 | 1 | 1 | 1 | remnant | 234/220 | 4.48 | 20 | 1.45 |
| 3 | 3 | — | 0.5 | remnant | 231/225 | 7.13 | 17 | 1.48 |
| 3 | 3 | 0.5 | 0.2 | remnant |  | 7.04 | 17 | 1.5 |
| 3 | 3 | 0.5 | 0.5 | remnant | 229/220 | 7.14 | 16 | 1.5 |
| 3 | 6 | 0.5 | — | remnant | 226/220 | 6.36 | 29 | 1.38 |
| 3 | 6 | — | 0.5 | remnant | 230/224 | 5.97 | 10 | 1.5 |
| 3 | 6 | 0.5 | 0.5 | remnant | 228/221 | 6.67 | 8 | 1.51 |

As shown in the table, when the Sb content in the Sn—Sb alloy is increased, the tensile strength is increased, however, the wettability tends to decrease.

When the Ag addition amount is increased, an improvement of strength is noted. However, the increase in strength is on nearly the same level even when 4 wt % or 6 wt % of Ag is added. Ag is effective for improving the wettability without substantially decreasing the melting point, however, when it exceeds 3.6 wt %, the melting temperature (liquid phase line) is increased, which requires an increase in working temperature, and the solid-liquid coexistence area with the eutectic temperature 221° C. (solid phase line) becomes large. Therefore, proper addition amount of Ag for improving the wettability is 1 to 3 wt %.

Since addition of Cu and/or Ni to Sn-3 wt % Sb improves the strength, it is found to provide a reinforcing effect. Addition of Ni in an amount of 0.5 wt % or 1.0 wt % to Sn-3 wt % Sb-1 wt % Ag 1 wt % exhibits good wettability, and it is found that both the strength and wettability are improved by a composite addition. Further, in Sn-3 wt % Sb-3 wt % Ag, addition of 0.5 wt % of Cu and Ni is the highest in strength, and the wettability is also better than Sn-5 wt % Sb solder alloy and Sn-8 wt % Sb solder alloy. By composite addition of 3 wt % Ag, 0.5 wt % Cu and 0.5 wt % Ni to Sn-3 wt % Sb solder alloy, the strength is increased by a factor of 3 to 5. Although single addition of Cu or Ni has a strength improvement effect, composite addition is more effective for improving the thermal fatigue strength.

Sn—Sb alloy has a melting point in the range of 230–245° C., and is characterized by a superior thermal strength, however, is inferior in wettability. As can be seen from the measurement results obtained in the above example, by adding Ag, Cu, and/or Ni, a solder alloy can be obtained which is considerably superior in strength, has a heat resistance, and has an improved wettability as compared with Sn—Sb solder alloy containing more than 4 wt % of Sb.

Accordingly, the solder alloy of the present example comprises Sn as a main component and also comprises: $0<Sb\leq3.5$; $0<Ag\leq4.0$; and optionally a predetermined amount of at least one of $0<Cu\leq1.0$ (weight %); and $0<Ni\leq1.0$ (weight %). Thus, the solder alloy is considerably superior in terms of strength, has a heat resistance, and has an improved wettability as compared with Sn—Sb solder alloy containing more than 4 wt % of Sb. Further, the present alloys are preferable in view of environment since they do not contain lead.

(2) Sn—Sb solder alloy with first additive (Cu and/or Ni) and second additive (P and/or Ge)

Next, we will describe another Sn—Sb solder alloy which comprises further components. That is, the solder alloy further comprises: at least one selected from a group consisting of: $0<P\leq1.0$ (weight %); and $0<Ge\leq1.0$ (weight %) for further improving strength and wettability of the solder by preventing an oxidation of metallic components in the alloy, in addition to Ag, Cu, and/or Ni. Each of those components responsible for the characteristics of the alloy as follows.

Addition of Sb to Sn improves heat resistance of the alloy. Further, since Sb forms a solid solution in Sn to enhance strength and thus improves the thermal fatigue strength of the alloy. Still further, Sb in conjunction with other added elements improves wettability and mechanical strength.

Addition of Ag to Sn improves heat resistance, fatigue strength and wettability of the alloy. Ag exists in high concentration at crystal grain boundary, which suppresses movement of crystal grain boundary, thus improving fatigue strength of the alloy. Further, since Ag with a melting point of 980° C. improves heat resistance of the alloy, the thermal fatigue strength is improved. Sn—Ag alloy has an eutectic point at 3.5 wt % of Ag and at a temperature of 221° C. When Ag content exceeds 3.5 wt %, the liquid phase temperature is increased, and the soldering temperature must be increased to ensure the wettability, resulting in even larger solid-liquid coexistence area. Alloys containing 3 wt % and 6 wt % Ag are the same level in strength.

When Cu is added, Cu forms a solid solution in Sn, which improves strength and heat resistance of the alloy without degradation of wettability. When the soldered metal is Cu, this suppresses dissolution of Cu from the soldered metal to the solder alloy. When Cu content exceeds 3 wt %, the melting temperature (liquid phase temperature) sharply increases. Further, Japanese Patent Application Laid-open No. 5-50286 points out that in this case formation of an intermetallic compound ($Cu_3Sn$) increases, which results in degraded fatigue strength. In the following examples, the Cu content was less than 1.0 wt % to prevent degradation of fatigue strength due to excessive formation of intermetallic compounds.

When Ni is added, since Ni has a high melting temperature (1450° C.), thermal stability of the alloy is improved. Further, addition of Ni forms fine crystal texture, or forms Ni—Sn compounds, thereby improving strength and thermal fatigue characteristic. Still further, when soldering a Cu substrate, addition of Ni suppresses formation of an intermetallic compound ($Cu_3Sn$) which degrades the soldering strength. When Ni content exceeds 5 wt %, alloy production becomes difficult, and viscosity at soldering becomes high which decreases solder spreading. In the following examples, the Ni content was less than 1.0 wt % to improve rolling processability.

When P and/or Ge are added, a thin oxide film is formed during solder melting, which suppresses oxidation of solder components such as Sn. When the addition amount is excessive, oxide film due to P and/or Ge becomes excessively thick, which has adverse effects on solderability. In the following examples, the addition amount of P or Ge was 0.05–0.20 wt %.

When Ag, Cu, and/or Ni and further P and/or Ge are added to Sn—Sb alloy, a solder alloy with improved strength and solderability is obtained.

In the following examples, solder alloys can be fabricated by melting respective raw materials of Sn, Ag, Cu, Ni, Ge, and Sn-P mother alloy in an electric furnace. The Sn-P mother alloy is prepared by previously melting Sn and P. The respective raw materials used have purities of 99.99 wt % or more. The composition of the alloy is $0<Sb\leq3.5$; $0\leq Ag\leq4.0$; and a predetermined amount of at least one of first and second additives for improving solder characteristics, in addition to Sn as a main component. The first additive is provided for improving the properties of thermal resistance, strength, thermal fatigue, and bonding strength to a Cu substrate. Thus, the first additive may be at least one selected from a group consisting of: $0<Cu\leq1.0$ (weight %); and $0<Ni\leq1.0$ (weight %). The second additive is provided for improving the properties of preventing an oxidation of metallic components in the alloy. Thus, the second additive may be at least one selected from a group consisting of: $0<P\leq1.0$ (weight %); and $0<Ge\leq1.0$ (weight %). By the way, the amount of Ag to be added can be determined as follows. When the Ag content is increased, strength is improved. Addition of 4.0 wt % or less of Ag increases the strength, however, the strength is on nearly the same level even when the Ag content is increased to 6.0 wt %. Ag is an addition element which is effective for improving the wettability without substantially decreasing the melting temperature, however, when the Ag content exceeds 3.5 wt %, the melting temperature is increased requiring an increase in working temperature, resulting in larger solid-liquid coexistence area. Therefore, an appropriate Ag content for improving the strength and wettability is 4.0 wt % or less.

EXAMPLE 2

A Sn—Sb alloy having a composition of 3.0 wt % of Sb, 1.0 wt % of Ag, 0.5 wt % of Cu, 0.05 wt % of Ge, and remnant of Sn was fabricated.

EXAMPLE 3

A Sn—Sb alloy having a composition of 3.0 wt % of Sb, 1.0 wt % of Ag, 0.5 wt % of Cu, 0.05 wt % of P, and remnant of Sn was fabricated.

EXAMPLE 4

A Sn—Sb alloy having a composition of 3.0 wt % of Sb, 1.0 wt % of Ag, 0.5 wt % of Cu, 0.5 wt % of Ni, 0.05 wt % of Ge, and remnant of Sn was fabricated.

EXAMPLE 5

A Sn—Sb alloy having a composition of 3.0 wt % of Sb, 1.0 wt % of Ag, 0.5 wt % of Cu, 0.5 wt % of Ni, 0.10 wt % of Ge, and remnant of Sn was fabricated. 5

EXAMPLE 6

A Sn—Sb alloy having a composition of 3.0 wt % of Sb, 1.0 wt % of Ag, 0.5 wt % of Cu, 0.5 wt % of Ni, 0.05 wt % of P, and remnant of Sn was fabricated.

EXAMPLE 7

A Sn—Sb alloy having a composition of 3.0 wt % of Sb, 1.0 wt % of Ag, 0.5 wt % of Cu, 0.5 wt % of Ni, 0.20 wt % of P, and remnant of Sn was fabricated. Comparative Examples 1 to 5

Conventional tin-antimony alloys comprising Sn and Sb.

Comparative Examples 6 to 21

Conventional tin-antimony alloys obtained by adding at least one of Ag, Cu, and Ni to tin-antimony alloys.

Tensile test of the resulting solder alloys was performed at room temperature. Wettability was measured by a meniscograph method using a flux (RMA type).

Tensile strength, fracture elongation, wetting power, and magnitude of oxide film formation at solder melting of the solder alloys according to the present invention are shown in Table 2 along with characteristics of conventional Sn—Sb alloys and those which are mixed with at least one of silver, copper, and nickel. In Table 2, mark Δ indicates considerable formation of oxide film, mark ○ indicates small formation of oxide film, and mark ● indicates very small formation of oxide film.

TABLE 2

| | Sb | Ag | Cu | Ni | P | Ge | Sn | Melting point (° C.) | Tensile strength (kg/mm$^2$) | Elongation (%) | Wetting power (mN) | Oxide film |
|---|---|---|---|---|---|---|---|---|---|---|---|---|
| Comp. Ex. 1 | 8.0 | — | — | — | — | — | remnant | | 4.1 | 43 | 1.2 | Δ |
| Comp. Ex. 2 | 7.0 | — | — | — | — | — | remnant | | 4.31 | 47 | | Δ |
| Comp. Ex. 3 | 5.0 | — | — | — | — | — | remnant | 243/235 | 2.42 | 84 | 1.24 | Δ |
| Comp. Ex. 4 | 4.0 | — | — | — | — | — | remnant | | 2.73 | 44 | 1.27 | Δ |
| Comp. Ex. 5 | 3.0 | — | — | — | — | — | remnant | 240/235 | 1.21 | 137 | 1.32 | Δ |
| Comp. Ex. 6 | 3.0 | — | 0.5 | — | — | — | remnant | | 2.36 | 25 | 1.39 | Δ |
| Comp. Ex. 7 | 3.0 | — | 1.0 | — | — | — | remnant | 235/230 | 3.64 | 45 | 1.33 | Δ |
| Comp. Ex. 8 | 3.0 | — | — | 0.5 | — | — | remnant | | 3.53 | 18 | 1.51 | Δ |
| Comp. Ex. 9 | 3.0 | 1.0 | — | 0.2 | — | — | remnant | | 6.04 | 34 | 1.33 | Δ |
| Comp. Ex. 10 | 3.0 | 1.0 | 0.5 | — | — | — | remnant | | 4.73 | 28 | 1.35 | Δ |
| Example 2 | 3.0 | 1.0 | 0.5 | — | — | 0.05 | remnant | | 5.87 | 29 | 1.37 | ○ |
| Example 3 | 3.0 | 1.0 | 0.5 | — | 0.05 | — | remnant | | 4.31 | 28 | 1.25 | ● |
| Comp. Ex. 11 | 3.0 | 1.0 | 0.5 | 0.2 | — | — | remnant | | 5.34 | 14 | 1.3 | Δ |
| Comp. Ex. 12 | 3.0 | 1.0 | 0.5 | 0.5 | — | — | remnant | 235/221 | 5.7 | 21 | 1.4 | Δ |
| Example 4 | 3.0 | 1.0 | 0.5 | 0.5 | — | 0.05 | remnant | | 6.72 | 6.4 | 1.52 | ○ |
| Example 5 | 3.0 | 1.0 | 0.5 | 0.5 | — | 0.10 | remnant | | 6.9 | 12 | 1.5 | ○ |
| Example 6 | 3.0 | 1.0 | 0.5 | 0.5 | 0.05 | — | remnant | | 5.19 | 23 | 1.3 | ● |
| Example 7 | 3.0 | 1.0 | 0.5 | 0.5 | 0.20 | — | remnant | | 5.3 | 19 | 1.25 | ● |
| Comp. Ex. 13 | 3.0 | 1.0 | 1.0 | — | — | — | remnant | 233/222 | 5.34 | 32 | 1.33 | Δ |
| Comp. Ex. 14 | 3.0 | 1.0 | 1.0 | 0.5 | — | — | remnant | 232/220 | 5.6 | 15 | 1.45 | Δ |
| Comp. Ex. 15 | 3.0 | 1.0 | 1.0 | 1.0 | — | — | remnant | 234/220 | 5.7 | 17 | 1.45 | Δ |

TABLE 2-continued

|  | Sb | Ag | Cu | Ni | P | Ge | Sn | Melting point (° C.) | Tensile strength (kg/mm²) | Elongation (%) | Wetting power (mN) | Oxide film |
|---|---|---|---|---|---|---|---|---|---|---|---|---|
| Comp. Ex. 16 | 3.0 | 3.0 | — | 0.5 | — | — | remnant | 231/225 | 7.13 | 17 | 1.48 | Δ |
| Comp. Ex. 17 | 3.0 | 3.0 | 0.5 | 0.2 | — | — | remnant |  | 7.04 | 17 | 1.5 | Δ |
| Comp. Ex. 18 | 3.0 | 3.0 | 0.5 | 0.5 | — | — | remnant | 229/220 | 7.14 | 16 | 1.5 | Δ |
| Comp. Ex. 19 | 3.0 | 6.0 | 0.5 | — | — | — | remnant | 226/220 | 6.36 | 29 | 1.38 | Δ |
| Comp. Ex. 20 | 3.0 | 6.0 | — | 0.5 | — | — | remnant | 230/224 | 5.97 | 10 | 1.5 | Δ |
| Comp. Ex. 21 | 3.0 | 6.0 | 0.5 | 0.5 | — | — | remnant | 228/221 | 6.67 | 8 | 1.51 | Δ |

Conventional Sn—Sb alloys are shown to increase in strength when the Sb content is increased, however, wettability is degraded. In addition, conventional Sn—Sb alloys show considerable formation of oxide film.

Addition of Cu and/or Ni to a conventional Sn—Sb alloy, for example, to Sn—Sb alloy (3.0 wt % Sb), increases the strength. When 0.5 wt % or 1.0 wt % of Ni is added to Sn—Sb alloy (3.0 wt % Sb+1.0 wt % Ag+1.0 wt % Cu), the wettability is the best, and strength and wettability are improved due to composite addition. However, conventional Sn—Sb alloys exhibit conspicuous oxide film formation.

In the solder alloys according to the present invention which are based on conventional Sn—Sb alloys and mixed with P and/or Ge, formation of oxide film is minimized or reduced. By addition of P in an amount of 0.05–0.20 wt %, oxide film formed on the surface at solder melting is very small. A good result is obtained with stable wettability along with the addition effect of Cu and/or Ni. Addition of P suppresses formation of oxide film during soldering to provide good solderability.

By addition of Ge in an amount of 0.05–0.10 wt %, formation of oxide film on the surface during solder melting is remarkably reduced, and improvement of tensile strength is also noted. Further, a good wettability is also obtained. Addition of Ge also provides improvement of strength. Still further, since Ge is small in consumption rate by oxidation compared to P, a stable oxidation suppression effect can be obtained. Ge is stable in oxidation rate compared with P, and thus maintains its effect even with a small amount of addition.

Since addition of P and/or Ge suppresses oxidation of Sn, it provides a solder alloy of good quality with reduced surface oxidation not only during soldering but also in the fabrication of solder alloy. For example, when a solder alloy powder is processed for a cream solder, it is preferable to be fabricated in the form of balls, however, to obtain a ball form, it is required to suppress surface oxidation as possible, and control the shape by only the surface tension. Addition of P and/or Ge is also effective in the fabrication of ball-formed particles.

As described above, by adding Ag, Cu, Ni, and further Ge or P or both to Sn—Sb alloy, a solder alloy can be obtained which is superior in strength, has a heat resistance, has an improved wettability and is good in solderability.

According to the present embodiment, a solder alloy with good thermal fatigue strength and solderability can be obtained. Further, since this solder alloy does not contain Pb, it does not cause environmental pollutions.

(3) Sn—Ag solder alloy

In the Sn—Ag alloy according to the present invention, Cu and/or Ni are added to improve heat resistance and thermal fatigue resistance.

The solder alloy comprises: $0<Ag \leq 4.0$ (weight %); and at least one of $0<Cu \leq 2.0$ (weight %) and $0<Ni \leq 1.0$ (weight %), in addition to Sn as a main component. Optionally, it may further comprise at least one additive selected from a group consisting of: $0<P \leq 1.0$ (weight %); and $0<Ge \leq 1.0$ (weight %).

Addition of Ag to Sn improves heat resistance, fatigue resistance, and wettability of the alloy. Ag exists in high concentration at crystal grain boundary, and suppresses movement of the crystal grain boundary thus improving fatigue strength of the alloy. Further, since Ag with a melting temperature of 980° C. improves heat resistance of the alloy, it improves thermal fatigue strength. Sn—Ag alloy has an eutectic point at 3.5 wt % of Ag and at a temperature of 221° C. When Ag content exceeds 3.5 wt %, the liquid phase temperature is increased, and the soldering temperature must be increased to ensure the wettability, resulting in even larger solid-liquid coexistence area. Alloys containing 3 wt % and 6 wt % Ag are on the same level in strength.

When Cu is added, Cu forms a solid solution in Sn, and improves strength and heat resistance of the alloy without degrading wettability. When the soldered metal is Cu, this suppresses dissolution of Cu from the soldered metal to the solder alloy. When Cu content exceeds 3 wt %, the melting temperature (liquid phase temperature) sharply increases. Further, Japanese Patent Application Laid-open No. 5-50286 points out that in this case formation of an intermetallic compound ($Cu_3Sn$) increases, which results in degraded thermal fatigue strength. In the following examples, the Cu content was in the range from 0.1–2.0 wt % to prevent degradation of fatigue strength due to excessive formation of intermetallic compounds.

When Ni is added, since Ni has a high melting temperature (1450° C.), it increases thermal stability of the alloy. Further, addition of Ni forms fine crystal structure, or forms Ni—Sn compounds, thereby improving strength and thermal fatigue characteristic. Still further, when soldering a Cu substrate, addition of Ni suppresses formation of an intermetallic compound ($Cu_3Sn$) causing degradation of the soldering strength. When Ni content exceeds 5 wt %, alloy production becomes difficult, and viscosity at soldering becomes high which decreases solder spreading. In the following examples, the Ni content was 1.0 wt % or less to improve rolling processability.

When P and/or Ge are added, a thin oxide film is formed during solder melting, which suppresses oxidation of solder components such as Sn. When the addition amount is excessive, oxide film due to P and/or Ge becomes excessively thick, which has adverse effects on solderability. In the following examples, the addition amount of P or Ge was 0.05–0.20 wt %.

When Cu and/or Ni, P or Ge are added to Sn—Ag alloy, a solder alloy with improved strength and solderability is obtained.

Solder alloys can be fabricated by melting respective raw materials of Sn, Ag, Cu, Ni, Ge, and Sn-P mother alloy in an electric furnace. The Sn-P mother alloy is obtained by previously melting Sn and P. The respective raw materials used have purities of 99.99 wt % or more. Sn is a main component. Ag in an amount of 1.0 to 3.5 wt %, Cu of 20. wt % or less, and Ni of 1.0 wt % or less are added. P or Ge or both of P and Ge are added in addition to Ag, Cu, and/or Ni. The P content is 0.2 wt % or less, and the Ge content is 0.1 wt % or less.

EXAMPLE 8

Tensile test of the resulting solder alloys was performed at room temperature. Wettability was measured by a meniscograph method using a flux (RMA type).

Tensile strength, fracture elongation, wetting power, and formation state of oxide film at solder melting are shown in Table 3. In Table 3, mark Δ indicates considerable formation of oxide film, mark ○ indicates small formation, and mark ● indicates very small formation.

By the addition of 0.05 to 0.1 wt % of Ge, formation of oxide film on the liquid surface during solder melting is remarkably reduced, and further an improvement of tensile strength is obtained. A good wettability is also obtained. Addition of Ge, as with the addition of P, is effective for any of dipping and plate joining, and also improves the strength. Further, since Ge is small in consumption rate by oxidation as compared to P, a stable Sn oxidation suppressing effect is obtained.

Since addition of P and/or Ge suppresses oxidation of Sn, it provides a solder alloy of good quality with reduced surface oxidation not only during soldering but also in the fabrication of solder alloy. For example, when a solder alloy powder is processed for a cream solder, it is preferable to be fabricated in the form of balls, however, to obtain a ball form, it is required to suppress surface oxidation as possible, and control the shape by only the surface tension. Addition of P and/or Ge is also effective in the fabrication of ball-formed particles.

TABLE 3

| Ag | Cu | Ni | P | Ge | Sn | Tensile strength (kg/mm²) | Elongation (%) | Wetting power (mN) | Oxide film |
|---|---|---|---|---|---|---|---|---|---|
| 3.5 | — | — | — | — | remnant | 4.7 | 25 | 1.50 | Δ |
| 3.5 | 0.5 | — | — | — | remnant | 4.8 | 28 | 1.60 | Δ |
| 4.0 | 0.5 | — | — | — | remnant | 5.4 | 28 | 1.60 | Δ |
| 3.5 | 0.5 | — | — | 0.05 | remnant | 5.5 | 26 | 1.60 | ○ |
| 3.5 | 1.0 | — | — | — | remnant | 6.1 | 20 | 1.60 | Δ |
| 3.5 | — | 0.2 | — | 0.05 | remnant | 6.1 | 30 | 1.65 | ○ |
| 3.5 | 0.5 | 0.1 | — | — | remnant | 5.7 | 27 | 1.70 | Δ |
| 4.0 | 0.5 | 0.1 | — | — | remnant | 5.7 | 26 | 1.65 | Δ |
| 3.5 | 0.5 | 0.07 | 0.05 | — | remnant | 5.1 | 25 | 1.60 | ● |
| 3.5 | 0.5 | 0.1 | — | 0.05 | remnant | 6.1 | 26 | 1.75 | ○ |
| 4.0 | 0.5 | 0.1 | — | 0.05 | remnant | 6.3 | 25 | 1.75 | ○ |
| 3.5 | 0.5 | 0.2 | — | — | remnant | 5.7 | 19 | 1.60 | Δ |
| 3.5 | 2.0 | 0.2 | — | — | remnant | 6.9 | 17 | 1.70 | Δ |
| 3.5 | 0.5 | 0.2 | 0.05 | — | remnant | 4.8 | 33 | 1.60 | ● |
| 3.5 | 0.5 | 0.1 | 0.1 | — | remnant | 5.5 | 17 | 1.60 | ● |
| 3.5 | 0.5 | 0.2 | 0.2 | — | remnant | 6.5 | 17 | 1.75 | ● |
| 3.5 | 0.5 | 0.2 | — | 0.05 | remnant | 6.8 | 19 | 1.70 | ○ |
| 3.5 | 0.5 | 0.2 | — | 0.10 | remnant | 6.9 | 25 | 1.70 | ○ |
| 3.0 | 1.0 | 0.5 | — | — | remnant | 5.8 | 21 | 1.70 | Δ |
| 3.5 | 1.0 | 1.0 | — | — | remnant | 5.9 | 18 | 1.70 | Δ |
| 6.0 | 0.5 | — | — | — | remnant | 5.3 | 23 | 1.60 | Δ |
| 6.0 | 0.5 | 0.5 | — | — | remnant | 6.3 | 13 | 1.75 | Δ |

An increase in Ag addition improves strength. By the addition of 3.5 wt % of Ag, the strength is increased, however, the strength is on nearly the same level even when Ag content is increased to 6 wt %. Ag is an addition element which is effective for improving the wettability without substantially decreasing the melting temperature, however, when the Ag content exceeds 3.5 wt %, the melting temperature is increased which requires an increase in working temperature, resulting in larger solid-liquid coexistence area. Therefore, an appropriate Ag content for improving the strength and wettability is to 1.0 to 4.0 wt %.

By the addition of Cu and/or Ni, an improvement of wettability is noted. Although a remarkable increase is not noted in the tensile strength of examples because the alloy is sufficiently reinforced by the addition of Ag, however, addition of these metals contributes to thermal stability.

By the addition of 0.05 to 0.2 wt % of P, an oxide film formed on the liquid surface during solder melting is very small. In conjunction with the addition effect of Cu and/or Ni, good results with stable wettability are obtained. Addition of P suppresses formation of oxide film in the case of dip soldering and the like to provide a good solderability, and also improves solderability in joining plates or the like.

As described above, by adding Cu and/or Ni, and further P or Ge or both of P and Ge to Sn—Ag alloy, a solder alloy can be obtained which is superior in strength, has a heat resistance, has an improved wettability and is good in solderability.

Ge is stable in oxidation rate compared to P, it maintains an effect even in a low amount of addition.

According to the present embodiment, the resulting solder alloy is good in thermal fatigue strength and solderability. Further, since this solder alloy does not contain Pb, it causes no pollutions.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A solder alloy which is lead free, consisting essentially of, in weight %:

Sn;
0<Ag≦4.0;
0<Cu≦2.0;
0<Ni≦1.0;and
0<Ge≦1,
    wherein addition of Ni and Ge to the solder alloy enhances wettability and tensile strength, and prevents formation of an oxide film.

2. A solder alloy which is lead free, consisting essentially of, in weight %:

Sn;
0<Sb≦3.5;
0≦Ag≦4.0;
0<Ge≦1.0; and
at least one first additive selected from the group consisting of (a) 0<Ni≦1.0 and (b) a combination of 0<Ni≦1.0 and 0<Cu≦1.0;
    wherein addition of Ni and Ge to the solder alloy enhances wettability and tensile strength, and prevents formation of an oxide film.

* * * * *